(No Model.)
J. J. BURK.
STAVE FOR BARRELS.
No. 248,571.
Patented Oct. 25, 1881.
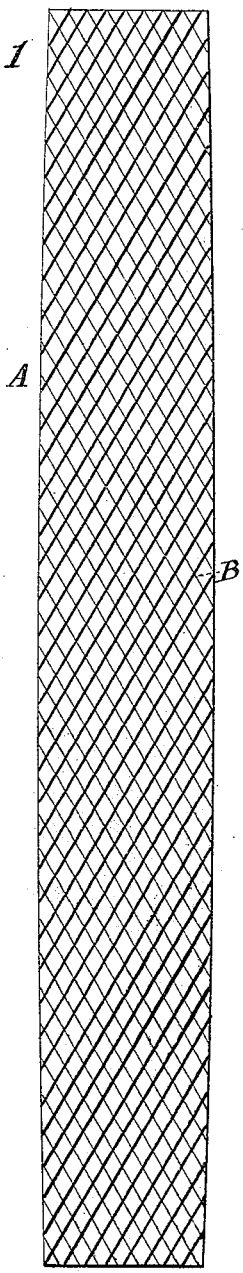
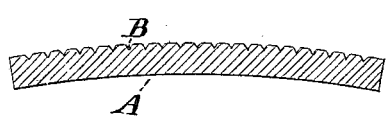
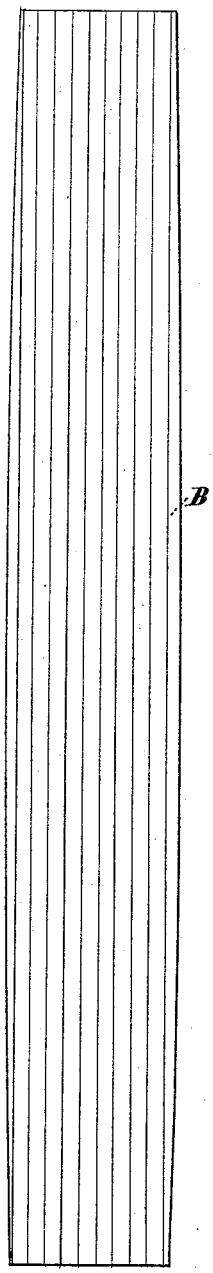
Witnesses.
J. W. Brann
A. J. Sangster
Inventor.
John J. Burk.
By James Sangster
Att'y.

UNITED STATES PATENT OFFICE.

JOHN J. BURK, OF BUFFALO, NEW YORK, ASSIGNOR OF ONE-HALF TO EDWARD M. JEWETT, OF SAME PLACE.

STAVE FOR BARRELS.

SPECIFICATION forming part of Letters Patent No. 248,571, dated October 25, 1881.

Application filed July 25, 1881. (No model.)

*To all whom it may concern:*

Be it known that I, JOHN J. BURK, a citizen of the United States, residing in Buffalo, in the county of Erie and State of New York, have invented certain new and useful Improvements in Staves for Barrels or for similar Purposes, of which the following is a specification.

The object of my invention is to produce a stave for barrels, kegs, pails, tubs, or other similar articles having its outer surface prepared so as to hold the hoops more securely in place, and so that the appearance of the same or a barrel or other article made therefrom shall be greatly improved; and it consists of a stave having its surface covered with a series of grooves arranged either longitudinally or at any suitable angle crosswise of the stave, as will be more clearly hereinafter shown by reference to the drawings, in which—

Figure 1 represents a front view of a stave having a double series of grooves arranged so as to cross each other. Fig. 2 is a cross-section through a stave, and Fig. 3 represents a stave having a series of parallel grooves arranged longitudinally.

A is the stave. B represents the grooves, which may be arranged either crosswise, lengthwise, or in any other suitable way, so as to produce a uniformly-grooved surface. The grooves are produced by passing the staves while in a dry state through powerful rollers having corresponding grooves. By this operation the stave is made a little thinner and its outer surface much improved, as it is made more uniform by the grooves, which are arranged evenly over its entire surface. Besides, the stave is in a much better condition to hold the hoops so that they cannot slip so easily out of place, as will be readily seen.

I claim as my invention—

A stave for barrels, having its outer surface covered with a series of grooves, substantially as and for the purposes specified.

JOHN J. BURK.

Witnesses:
JAMES SANGSTER,
AMOS W. SANGSTER.